(12) United States Patent
Kang (10) Patent No.: US 11,024,324 B2
(45) Date of Patent: Jun. 1, 2021

(54) METHODS AND DEVICES FOR RNN-BASED NOISE REDUCTION IN REAL-TIME CONFERENCES

(71) Applicant: YEALINK (XIAMEN) NETWORK TECHNOLOGY CO., LTD., Fujian (CN)

(72) Inventor: Yuanxun Kang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 16/628,679

(22) PCT Filed: Aug. 22, 2018

(86) PCT No.: PCT/CN2018/101820
§ 371 (c)(1),
(2) Date: Jan. 5, 2020

(87) PCT Pub. No.: WO2020/029332
PCT Pub. Date: Feb. 13, 2020

(65) Prior Publication Data
US 2021/0035594 A1  Feb. 4, 2021

(30) Foreign Application Priority Data
Aug. 9, 2018  (CN) .......................... 201810904699.2

(51) Int. Cl.
*G10L 21/00* (2013.01)
*G10L 15/22* (2006.01)
(Continued)

(52) U.S. Cl.
CPC ............ *G10L 21/0216* (2013.01); *G06N 3/08* (2013.01); *G10L 25/18* (2013.01); *G10L 25/30* (2013.01); *G10L 25/45* (2013.01); *G10L 25/60* (2013.01)

(58) Field of Classification Search
CPC ................................ G10L 21/00; G10L 15/22
See application file for complete search history.

(56) References Cited

U.S. PATENT DOCUMENTS 5,839,101 A * 11/1998 Vahatalo ............. G10L 21/0208
704/226
6,097,820 A *  8/2000 Turner ................ G10L 21/0208
381/94.2

(Continued)

*Primary Examiner* — Shreyans A Patel (57) ABSTRACT

Disclosed herein is a method for RNN-based noise reduction in a real-time conference, comprising: performing frame-and-window for a speech signal to obtain a logarithmic spectrum of the speech signal, and placing the logarithmic spectrum into the RNN model to determine a noise reduction suppression coefficient, and then obtaining the denoised speech signal by applying the noise reduction suppression coefficient to the logarithmic spectrum of the original signal, thereby achieving utilization of the RNN noise reduction method in real-time conferences. In the present disclosure, when inputting the RNN model for estimation, only the logarithmic spectrum of the current frame needs to be inputted. The RNN model of the present disclosure has few requirements on inputted information, without performing huge preprocessing on the received speech signal, which in turn reduces computation burden, increases response speed, and enhances real-time performance.

16 Claims, 5 Drawing Sheets

(51) Int. Cl.
*G10L 21/0216* (2013.01)
*G06N 3/08* (2006.01)
*G10L 25/18* (2013.01)
*G10L 25/30* (2013.01)
*G10L 25/45* (2013.01)
*G10L 25/60* (2013.01)

(56) References Cited

U.S. PATENT DOCUMENTS

| | | | |
|---|---|---|---|
| 8,239,196 B1 * | 8/2012 | Paniconi | G10L 21/0216 704/233 |
| 2012/0035920 A1 * | 2/2012 | Hayakawa | G10L 21/0208 704/226 |
| 2015/0243284 A1 * | 8/2015 | Guo | G10L 21/0208 704/233 |

* cited by examiner

METHODS AND DEVICES FOR RNN-BASED NOISE REDUCTION IN REAL-TIME CONFERENCES

FIELD OF THE DISCLOSURE

The present disclosure relates to a method and a system for noise reduction in a real-time conference, more particularly, to a method and a device for RNN-based noise reduction in a real-time conference.

BACKGROUND OF THE DISCLOSURE

For decades, the problem to be solved in a real-time conference system is separation of noise and speech. The main problem to be solved is that the microphone collects the noise of the surrounding environment (air conditioning noise, keyboard noise, environmental noise, etc.) while collecting the sound of the speaker in the real-time conference system. Recently, noise reduction mainly focuses on two aspects.

In one aspect, a microphone array of multiple microphone devices is used to reduce noise. The multiple microphones simultaneously collect sounds, and the phase difference between multiple signals is calculated, so as to obtain spatial information of the sound source. The adjacent sound sources are removed by using techniques such as MVDR, thereby enhancing signal-to-noise ratio. However, such microphone array produces high cost and complicated arrangement, and it has no effect on the noise from the same direction as the speaker. In another aspect, a single microphone is used with conventional noise suppression. By estimating noise based on noise characteristics, the noise is suppressed. Such single microphone has simple arrangement, but merely has significant effect on the smooth bottom noise of the environment. Use of bottom noise of the environment is based on a stationary Gaussian distribution. However, the sudden noise cannot be correctly estimated.

In recent years, techniques for noise suppression by virtue of deep learning techniques occur. Deep learning is based on machine learning theory, which is a neural network that performs analysis and learning by building and simulating the human brain. Geoffery Hinton proposes a deep learning (DNN) method (A Fast Learning Algorithm for Deep Belief Nets) for Deep Belief Networks (DBN, Deep Belief Networks) formed by overlapping multiple restricted Boltzmann Machines (RBM, Restricted Boltzmann Machines). In the past two years, noise reduction for speech is performed by learning speech characteristics based on a large amount of calibrated noise data and speech. This method, which takes advantage of a large amount of calibrated noise data and speech to learn speech characteristics and thus perform noise reduction for speech, can be implemented by a Recurrent Neural Network (RNN). However, there are still many problems in noise reduction for speech implemented by using RNN, which in turn limit application of RNN-based noise reduction method in real-time conferences. Firstly, one critical problem is that the current method for RNN noise reduction for speech fails to meet the real-time requirements of real-time conferences. Secondly, the volume of the data to be processed by the RNN-based noise reduction method is too large to integrate into the real-time conference system. Since the RNN noise reduction method has poor real-time performance and large computation burden, such noise reduction method cannot be used in the real-time conference system. Therefore, there is a need for the RNN noise reduction method that can be used in real-time conferences.

SUMMARY OF THE DISCLOSURE

Provided herein are a method and a device for RNN-based noise reduction in a real-time conference, to solve the problems caused by poor real-time performance and large computation burden of the current RNN noise reduction method that cannot be used in a real-time conference system.

In one aspect, provided herein is a method for RNN-based noise reduction in a real-time conference, comprising the following steps:

S1, training RNN model that uses GRU to determine suitable parameters for the RNN model, to obtain the trained RNN model;

S2, performing frame-and-window for the speech signal transmitted by a collecting unit, to calculate a logarithmic spectrum of each frame of the speech signal in the frequency domain;

S3, placing the logarithmic spectrum of the current frame into the trained RNN model for estimation, to obtain an estimated logarithmic spectrum of the current speech;

S4, calculating a signal-to-noise ratio of the current frame according to the estimated logarithmic spectrum and the logarithmic spectrum of the original signal, to calculate a current noise reduction suppression coefficient according to the signal-to-noise ratio;

S5, applying the noise reduction suppression coefficient to the logarithmic spectrum of the original signal, performing window overlap and inverse Fourier transform on the result, and transmitting the result to a corresponding playing device through a network, to play the processed signal.

Compared with the prior arts, the RNN-based noise reduction method in a real-time conference as disclosed herein comprises: performing frame-and-window for a speech signal to obtain a logarithmic spectrum of the speech signal, and placing the logarithmic spectrum into the RNN model to determine a noise reduction suppression coefficient, and then obtaining the denoised speech signal by applying the noise reduction suppression coefficient to the logarithmic spectrum of the original signal, thereby achieving utilization of the RNN noise reduction method in real-time conferences. In particular, the conventional RNN model is not suitable for the noise reduction in real-time conferences since it cannot well handle the long-distance dependence. For the LSTM which can well handle the long-distance dependence, it cannot be used for noise reduction in a real-time conference due to many existing problems, such as complicated structure, design difficulty, large computation burden, and unsatisfied real-time requirements. The structure of the GRU is relatively simple and suitable for noise reduction in a real-time conference. Therefore, the RNN model as used herein is the RNN model that uses the GRU. The GRU model as used herein retains information in past-time to some extent by updating and resetting the gate, so as to ensure the reliability of the training model. Since the GRU model as used herein retains the characteristics of the information in past-time to some extent, and an appropriate window length is selected for performing the frame-and-window of the speech signal, when inputting the RNN model for estimation, only the logarithmic spectrum of the current frame needs to be input. The RNN model of the present disclosure has few requirements on inputted information, without performing huge preprocessing on the received speech signal, which in turn reduces computation burden, increases response speed, and enhances real-time performance. At the same time, a logarithmic spectrum in the frequency domain is used when performing signal comparison, and the logarithmic spectrum can significantly highlight the signal variation, and the logarithmic spectrum can be used to facilitate signal comparison when performing signal comparison. In the present disclosure, a logarithmic spectrum in the frequency domain is used for further reduction of the time for signal comparison and improvement of the real-time performance. Finally, after the logarithmic spectrum of the original signal is processed by the noise reduction suppression coefficient, the processed result is subjected to window overlap and inverse Fourier transform processing. Since the denoised signal is still subjected to window overlap processing, the effect for the processed signal can be further ensured, and excessive noise reduction can be avoided to ensure speech integrity. In this regard, in the present disclosure, computation burden is reduced compared with that in the general RNN noise reduction method, the model structure and signal processing is simplified, and the real-time performance is enhanced by performing frame-and-window for the speech signal, selecting an appropriate window length, using the RNN model that uses the GRU, and using the logarithmic spectrum in the frequency domain to compare the signals. Moreover, the denoised signal is still subjected to window overlap processing, without excessive noise reduction, so as to ensure the speech integrity. The RNN-based noise reduction method in a real-time conference as provided herein solves the problems caused by poor real-time performance and large computation burden in the currently existing RNN noise reduction method which cannot be used in a real-time conference system. The RNN-based noise reduction method as provided herein has simple structure, simplified signal processing, reduced data computation burden and great real-time performance, thereby achieving RNN-based noise reduction in a real-time conference.

Further, the step S1 comprises the following steps:

S11, collecting a pure speech signal and a noise speech signal, and superimposing the pure speech signal and the noise speech signal in a time domain to generate a noisy speech signal;

S12, performing frame-and-window for the noisy speech signal and the pure speech signal respectively, to calculate the logarithmic spectrum of each frame in the frequency domain, comparing the logarithmic spectrum of the noisy speech signal with the logarithmic spectrum of the pure speech signal to obtain corresponding accurate suppression parameters;

S22, using the logarithmic spectrum of the noisy speech signal obtained after performing the frame-and-window as an input for the RNN model that uses the GRU;

S23, generating a corresponding estimated logarithmic spectrum by allowing the logarithmic spectrum of the noisy speech signal to pass through a fully connected layer and two GRU layers, to obtain the expected suppression parameters according to the estimated logarithmic spectrum and the logarithmic spectrum of the noisy speech signal;

S24, calculating a mean square error using the expected suppression parameters and the accurate suppression parameters, judging whether the mean square error is lower than the threshold, wherein if YES, this step is ended; and wherein if NOT, the mean square error is used for derivation to update the parameters of the RNN model that uses the GRU and return to step S11.

The RNN-based noise reduction method in a real-time conference, as provided herein comprises determining appropriate parameters for the RNN model by training the RNN model that adopts the GRU. The training signal synthesizes the noisy speech signal with the pure speech signal and the noise speech signal, calculates the mean square error of the accurate suppression parameters and the expected suppression parameters, and uses the mean square error for derivation to update the parameters of the RNN model that adopts the GRU. The expected suppression parameters in the present disclosure is calculated from an estimated logarithmic spectrum and a logarithmic spectrum of a noisy speech signal. The estimated logarithmic spectrum is generated by allowing the logarithmic spectrum of the noisy speech signal to pass through a fully connected layer and two GRU layers. The fully connected layer and the two GRU layers are the RNN model structure as used herein. The RNN model is composed of a fully connected layer and two GRU layers, with simple model structure and the structure of the GRU layer itself is relatively simple. The RNN model as used in the present disclosure has a simple structure and improves the real-time performance of signal noise reduction to some extent. Furthermore, although the RNN model has a simple structure, it can achieve an excellent noise reduction effect in combination with the signal processing steps and the characteristics of the GRU itself. Therefore, the RNN model as provided herein achieves use of RNN noise reduction in real-time conferences, and solves the problems caused by poor real-time performance and large computation burden in the currently existing RNN noise reduction method that cannot be used in a real-time conference system. The present disclosure provides a RNN-based noise reduction method which has simple structure, simplified signal processing, reduced data computation burden and great real-time performance, and the RNN-based noise reduction method as provided herein can be used in real-time conferences.

Further, frame-and-window for the signal is performed with the window length of 256 samples, and the framed signals are overlapped by 50%.

The optimal window length in the present disclosure is 256 samples, which can improve the computation efficiency while ensuring that information is not lost. In particular, the GRU model can retain limited information in the past-time. For the purpose of satisfying the requirements on noise reduction effect and real-time performance in the real-time conference, the present disclosure provides an improvement on processing of speech signals. Since the minimum unit of a segment of speech can be divided into a basic syllable, the basic syllable of ordinary people's speech is between 80 ms and 160 ms, and the fast Fourier transform can improve the calculation speed based on the data of $2^N$ length, the window length of the present disclosure is set to 256 samples. Although framing according to 256 samples per frame may result in loss of the previous frame information, such a window length is able to ensure an increased calculation speed without loss of information since the GRU model can retain the information in the past-time to some extent. And in the present disclosure, 50% overlap of the framed signals can avoid inter-frame mutation. Since the GRU model as used in the present disclosure could retain the characteristics of the information in past-time to some extent, and an appropriate window length is selected for performing the frame-and-window of the speech signal, when inputting the RNN model for estimation, only the logarithmic spectrum of the current frame needs to be inputted. The RNN model of the present disclosure has few requirements on inputted information, without performing huge preprocessing on the received speech signal, which in turn reduces computation burden, increases response speed, and enhances real-time performance.

In another aspect, provided herein is a RNN-based noise reduction device in a real-time conference, comprising a collection device, a computing device and a playing device. The collection device collects a noisy speech signal and transmits it to the computing device. The computing device processes the noisy speech signal to obtain a denoised speech signal which is transmitted to the playing device. The computing device is the one that uses the RNN-based noise reduction method in a real-time conference as described above.

Compared with the prior arts, the RNN-based noise reduction device in a real-time conference as disclosed herein comprises a collection device through which a speech signal is collected, a computing device through which the speech signal is subject to noise reduction processing, and a playing device through which a denoised speech signal is played, wherein the computing device adopts a RNN-based noise reduction method in a real-time conference as provided herein. The RNN-based noise reduction method in a real-time conference as disclosed herein comprises: performing frame-and-window for a speech signal to obtain a logarithmic spectrum of the speech signal, and placing the logarithmic spectrum into the RNN model to determine the noise reduction suppression coefficient, and then obtaining the denoised speech signal by applying the noise reduction suppression coefficient to the logarithmic spectrum of the original signal, thereby achieving utilization of the RNN noise reduction method in real-time conferences. In particular, the conventional RNN model is not suitable for the noise reduction in real-time conferences since it cannot well handle the long-distance dependence. For the LSTM which can well handle the long-distance dependence, it cannot be used for noise reduction in a real-time conference due to many existing problems, such as complicated structure, design difficulty, large computation burden, and unsatisfied real-time requirements. The structure of the GRU is relatively simple and suitable for noise reduction in a real-time conference. Therefore, the RNN model as used herein is the RNN model that uses the GRU. The GRU model as used herein retains information in past-time to some extent by updating and resetting the gate, so as to ensure the reliability of the training model. However, compared with LSTM, the GRU model can retain limited information in the past-time. For the purpose of satisfying the requirements on noise reduction effect and real-time performance in the real-time conference, the present disclosure provides an improvement on processing of speech signals. Since the minimum unit of a segment of speech can be divided into a basic syllable, the basic syllable of ordinary people's speech is between 80 ms and 160 ms, and the fast Fourier transform can improve the calculation speed based on the data of 2^N length, the window length of the present disclosure is set to 256 samples. Although framing according to 256 samples per frame may result in loss of the previous frame information, such a window length is able to ensure an increased calculation speed without loss of information since the GRU model can retain the information in the past-time to some extent. And in the present disclosure, 50% overlap of the framed signals can avoid inter-frame mutation. Since the GRU model as used in the present disclosure could retain the characteristics of the information in past-time to some extent, and an appropriate window length is selected for performing the frame-and-window of the speech signal, when inputting the RNN model for estimation, only the logarithmic spectrum of the current frame needs to be inputted. The RNN model of the present disclosure has few requirements on inputted information, without performing huge preprocessing on the received speech signal, which in turn reduces computation burden, increases response speed, and enhances real-time performance. At the same time, a logarithmic spectrum in the frequency domain is used when performing signal comparison, and the logarithmic spectrum can significantly highlight the signal variation, and the logarithmic spectrum can be used to facilitate signal comparison when performing signal comparison. In the present disclosure, a logarithmic spectrum in the frequency domain is used for further reduction of the time for signal comparison and improvement of the real-time performance. Finally, after the logarithmic spectrum of the original signal is processed by the noise reduction suppression coefficient, the processed result is subjected to window overlap and inverse Fourier transform processing. Since the denoised signal is still subjected to window overlap processing, the effect for the processed signal can be further ensured, and excessive noise reduction can be avoided to ensure speech integrity. In this regard, in the present disclosure, computation burden is reduced compared with that in the general RNN noise reduction method, the model structure and signal processing is simplified, and the real-time performance is enhanced by performing frame-and-window for the speech signal, selecting an appropriate window length, using the RNN model that uses the GRU, and using the logarithmic spectrum in the frequency domain to compare the signals. Moreover, the denoised signal is still subjected to window overlap processing, without excessive noise reduction, so as to ensure the speech integrity. Therefore, the RNN-based noise reduction device in a real-time conference as disclosed herein, realizes the application of the RNN noise reduction method in a real-time conference system, and solves the problem due to no RNN-based noise reduction device used in a real-time conference.

Further, the collection device further comprises a remote receiving unit, which is coupled to the computing device.

The present disclosure provides a RNN-based noise reduction device in a real-time conference, wherein the collection device is configured to collect speech information and send it to the computing device. The RNN-based noise reduction device in a real-time conference as provided herein is applied to a real-time conference system to reduce noise in the real-time conference. Currently, noise reduction in a real-time conference is achieved by performing noise reduction on the speech signal collected from the microphone, and the denoised speech signal is sent to the playing device via a network to play. Such playing device is another real-time conference system. In particular, the current real-time conferences often use two real-time conference systems which are in communication with each other. One conference system sends speech information to another one. The current noise reduction in a real-time conference performs noise reduction immediately after receiving the speech in the conference system, and the denoised information is sent to another conference system which plays the denoised speech. However, in the RNN-based noise reduction device in a real-time conference as provided by the present disclosure, the collection device comprises a remote receiving unit, that is, the collection device can receive the speech that has been subjected to noise reduction sent by other conference systems, and the computing device performs further noise reduction on the received speech. The further denoised speech information is sent by the computing device to the playing device to play. That is to say, the conference system receives the speech information that has been subjected to noise reduction by other conference systems, which is further denoised and then played by the conference systems. The present disclosure provides a RNN-based noise reduction device in a real-time conference, which performs noise reduction twice for both communication parties in the real-time conference. Such repeated noise reduction ensures the noise reduction effect of the speech information, and the speech noise in the real-time conference is extremely removed. The RNN-based noise reduction device in the real-time conference as provided herein utilizes the RNN model with simple structure and simplified processing method for speech signal, such that the RNN-based noise reduction device in a real-time conference has a simple structure, simplified signal processing, reduced data computation burden, and enhanced real-time performance, with twice noise reduction for both communication parties to satisfy the real-time requirements of the real-time conference. Provided herein is a device for applying RNN noise reduction method in a real-time conference system, which maintains excellent noise reduction effect from RNN noise reduction method, and satisfies the real-time requirements of the real-time conference, and in turn solves the problem due to no RNN-based noise reduction device used in a real-time conference.

DETAILED DESCRIPTION OF THE DISCLOSURE

The terminology as used herein is for the purpose of describing particular embodiments only and is not intended to be limiting of the disclosure. As used herein, the singular forms "a", "an" and "the" are intended to include the plural forms as well, unless the context clearly indicates otherwise.

Figure 1:
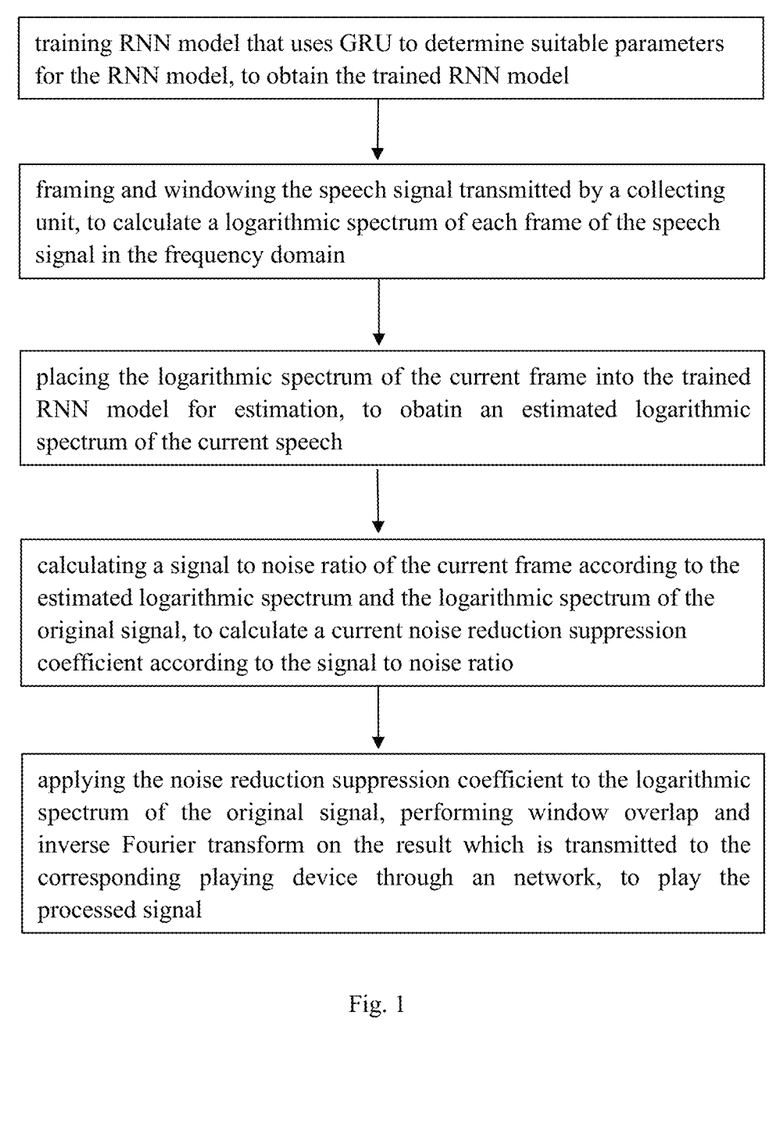
FIG. 1 is a flow chart of a RNN-based noise reduction method in a real-time conference as described herein.

As shown in FIG. 1, a method for RNN-based noise reduction in a real-time conference as described herein comprises the following steps: S1, training RNN model that uses GRU to determine suitable parameters for the RNN model, to obtain the trained RNN model; S2, performing frame-and-window for the speech signal transmitted by a collecting unit, to calculate a logarithmic spectrum of each frame of the speech signal in the frequency domain; S3, placing the logarithmic spectrum of the current frame into the trained RNN model for estimation, to obtain an estimated logarithmic spectrum of the current speech; S4, calculating a signal-to-noise ratio of the current frame according to the estimated logarithmic spectrum and the logarithmic spectrum of the original signal, to calculate a current noise reduction suppression coefficient according to the signal-to-noise ratio; S5, applying the noise reduction suppression coefficient to the logarithmic spectrum of the original signal, performing window overlap and inverse Fourier transform on the result, and transmitting the result to a corresponding playing device through a network, to play the processed signal.

Compared with the prior arts, the RNN-based noise reduction method in a real-time conference as disclosed herein comprises: performing frame-and-window for a speech signal to obtain a logarithmic spectrum of the speech signal, and placing the logarithmic spectrum into the RNN model to determine the noise reduction suppression coefficient, and then obtaining the denoised speech signal by applying the noise reduction suppression coefficient to the logarithmic spectrum of the original signal, thereby achieving utilization of the RNN noise reduction method in real-time conferences.

In particular, the conventional RNN model is not suitable for the noise reduction in real-time conferences since it cannot well handle the long-distance dependence. For the LSTM which can well handle the long-distance dependence, it cannot be used for noise reduction in a real-time conference due to many existing problems, such as complicated structure, design difficulty, large computation burden, and unsatisfied real-time requirements. The structure of the GRU is relatively simple and suitable for noise reduction in a real-time conference. Therefore, the RNN model as used herein is the RNN model that uses the GRU.

Figure 3:
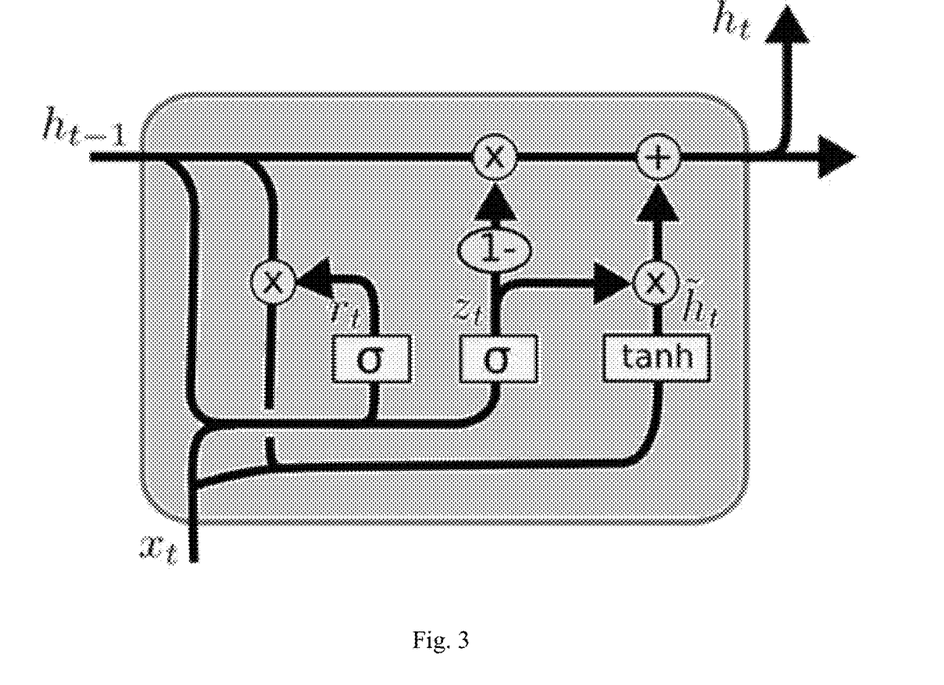
FIG. 3 is a schematic structural diagram of a GRU layer of a RNN-based noise reduction method in a real-time conference as described herein.

As shown in FIG. 3, the operational principle of the GRU used in the present disclosure is as follows:

The reset gate ($r_t$) is defined as follows: $r_t = \sigma(w_r \times [h_{t-1}, x_t])$;

The update gate ($z_t$) is defined as follows: $z_t = \sigma(w_z \times [h_{t-1}, x_t])$;

Both gates as mentioned above pass through the Sigmoid activation function, and the said function is defined as follows:

$$S(x) = \frac{1}{1+e^{-x}};$$

The results obtained by passing through the two gates are limited to [0,1] by the Sigmoid function.

$\tilde{h}_t$ is defined as the candidate implied state, and uses the reset gate to control the inflow of the last implied state containing the past time information. The smaller the reset gate is, the more the previous implied state which is discarded is. Therefore, the reset gate provides a mechanism to discard past implied states that are unrelated to the future.

$\tilde{h} = \tan h(W_{\tilde{h} \times [r_t * h_{t-1}, x_t]})$

Implied state $h_t$ uses update gate $z_t$ to update the previous implied state $h_{t-1}$ and the candidate implied state. The update gate can control the importance of the past implied state at the current moment. If the update gate always approximates to 1, the past implied state will always be saved by time and passed to the current moment. This design can cope with the gradient attenuation problem in the cyclic neural network and better capture the large interval dependencies in the time series data.

$h_t = (1-z_t) * h_{t-1} + z_t * \tilde{h}_t$ $y_t = \sigma(W_o \times h_t)$

The original input generates a corresponding estimated signal after passing through a connected layer and two GRUs, and then MSE is obtained from the logarithmic spectrum of the clean speech signal before synthesis. Convergence and iteration are continuously performed through the activation function. The parameters of Dense and GRU are updated to obtain the minimum error. The method can be implemented by any hardware devices having a computing instruction function. The present disclosure adopts multiple GPUs to performing training, resulting in acceleration of the training process.

The GRU model as used herein retains information in past-time to some extent by updating and resetting the gate, so as to ensure the reliability of the training model. Since the GRU model as used herein retains characteristics of the information in past-time to some extent, and an appropriate window length is selected for performing the frame-and-window of the speech signal, when inputting the RNN model for estimation, only the logarithmic spectrum of the current frame needs to be input. The RNN model of the present disclosure has few requirements on inputted information, without performing huge preprocessing on the received speech signal, which in turn reduces computation burden, increases response speed, and enhances real-time performance. At the same time, a logarithmic spectrum in the frequency domain is used when performing signal comparison, and the logarithmic spectrum can significantly highlight the signal variation, and the logarithmic spectrum can be used to facilitate signal comparison when performing signal comparison. In the present disclosure, a logarithmic spectrum in the frequency domain is used for further reduction of the time for signal comparison and improvement of the real-time performance. Finally, after the logarithmic spectrum of the original signal is processed by the noise reduction suppression coefficient, the processed result is subjected to window overlap and inverse Fourier transform processing. Since the denoised signal is still subjected to window overlap processing, the effect for the processed signal can be further ensured, and excessive noise reduction can be avoided to ensure speech integrity.

In this regard, in the present disclosure, computation burden is reduced compared with that in the general RNN noise reduction method, the model structure and signal processing is simplified, and the real-time performance is enhanced by performing frame-and-window for the speech signal, selecting an appropriate window length, using the RNN model that uses the GRU, and using the logarithmic spectrum in the frequency domain to compare the signals. Moreover, the denoised signal is still subjected to window overlap processing, without excessive noise reduction, so as to ensure the speech integrity. The RNN-based noise reduction method in a real-time conference as provided herein solves the problems caused by poor real-time performance and large computation burden in the currently existing RNN noise reduction method which cannot be used in a real-time conference system. The RNN-based noise reduction method as provided herein has simple structure, simplified signal processing, reduced data computation burden and great real-time performance, thereby achieving RNN-based noise reduction in a real-time conference.

Figure 2:
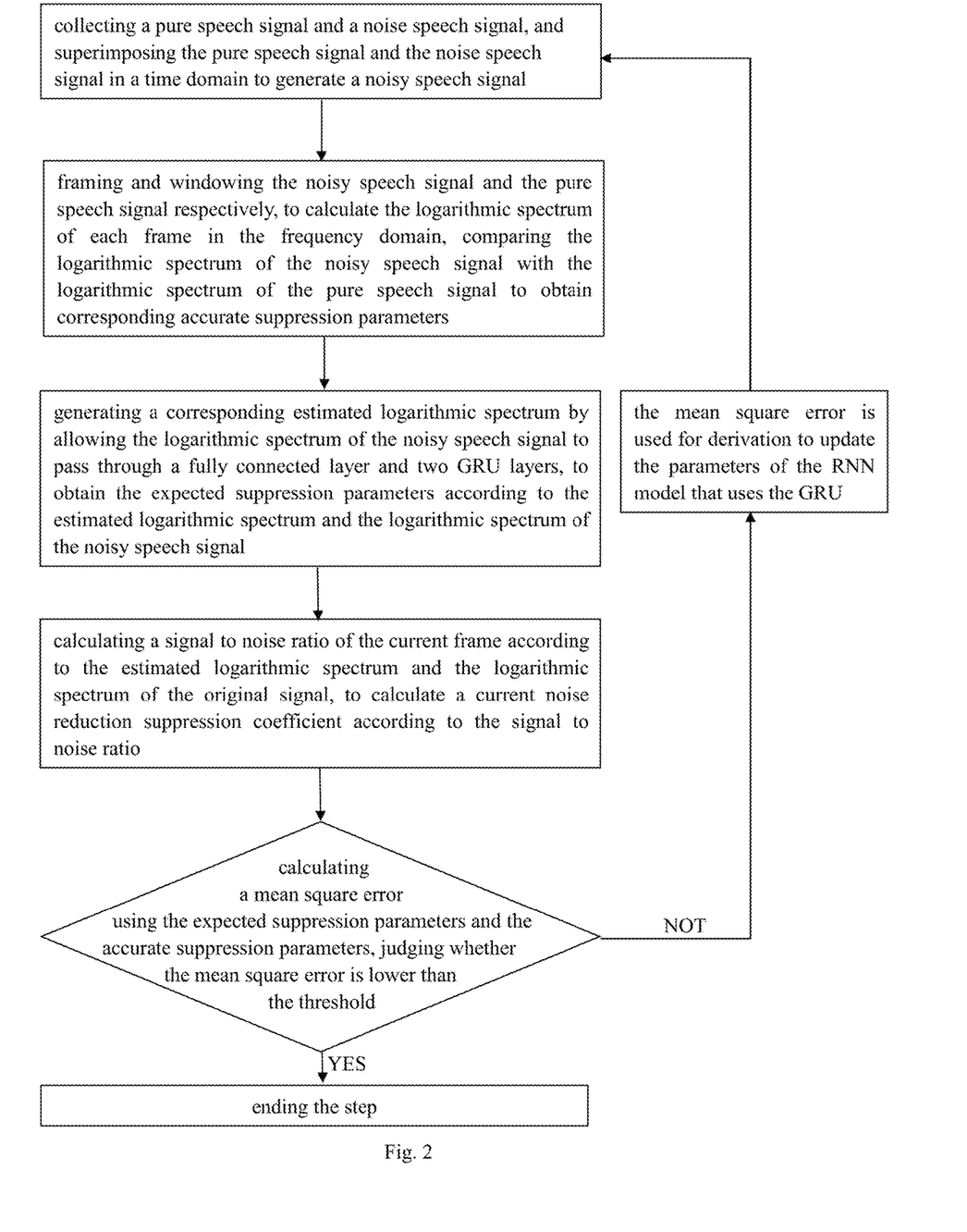
FIG. 2 is a flow chart of a step 51 of a RNN-based noise reduction method in a real-time conference as described herein.

As shown in FIG. 2, the step S1 comprises the following steps: S11, collecting a pure speech signal and a noise speech signal, and superimposing the pure speech signal and the noise speech signal in a time domain to generate a noisy speech signal; S12, performing frame-and-window for the noisy speech signal and the pure speech signal respectively, to calculate the logarithmic spectrum of each frame in the frequency domain, comparing the logarithmic spectrum of the noisy speech signal with the logarithmic spectrum of the pure speech signal to obtain corresponding accurate suppression parameters; S22, using the logarithmic spectrum of the noisy speech signal obtained after performing the frame-and-window as an input for the RNN model that uses the GRU; S23, generating a corresponding estimated logarithmic spectrum by allowing the logarithmic spectrum of the noisy speech signal to pass through a fully connected layer and two GRU layers, to obtain the expected suppression parameters according to the estimated logarithmic spectrum and the logarithmic spectrum of the noisy speech signal; S24, calculating a mean square error using the expected suppression parameters and the accurate suppression parameters, judging whether the mean square error is lower than the threshold, wherein if YES, this step is ended; and wherein if NOT, the mean square error is used for derivation to update the parameters of the RNN model that uses the GRU and return to step S11.

The step S1 of the present disclosure is the training step for the RNN model that uses the GRU. In particular, in the conference room, we collect sufficient clean and clear speech data, and then collect sufficient data merely containing noise. We assume that the noise that needs to be processed is additive noise. Therefore, two signals are superimposed in the time domain to generate noisy speech data according to the following formula: $SN_i = Speech_i + Noise_i$.

We extract features from noisy speech signals and pure speech signals, respectively. The feature extraction is performed by a windowed short-time Fourier transform to avoid the problem of inter-frame mutation and the framed signals are subject to 50% overlap. The fast Fourier transform can be performed based on the data of 2^N length to improve calculation speed, and therefore the window length is set to 256 samples. The window is defined as follows:

$$w_n = \sin\left[\frac{pi}{2}\sin^2\left(\frac{pi*n}{N}\right)\right].$$

After the short-time Fourier transform is performed according to the frame length data after performing the frame-and-window, the logarithmic spectrum of each frame in the frequency domain is calculated as an input of the neural network.

The RNN-based noise reduction method in a real-time conference, as provided herein comprises determining appropriate parameters for the RNN model by training the RNN model that adopts the GRU. The training signal synthesizes the noisy speech signal with the pure speech signal and the noise speech signal, calculates the mean square error of the accurate suppression parameters and the expected suppression parameters, and uses the mean square error for derivation to update the parameters of the RNN model that adopts the GRU. The expected suppression parameters in the present disclosure is calculated from an estimated logarithmic spectrum and a logarithmic spectrum of a noisy speech signal. The estimated logarithmic spectrum is generated by allowing the logarithmic spectrum of the noisy speech signal to pass through a fully connected layer and two GRU layers. The fully connected layer and the two GRU layers are the RNN model structure as used herein. The RNN model is composed of a fully connected layer and two GRU layers, with simple model structure and the structure of the GRU layer itself is relatively simple. The RNN model as used in the present disclosure has a simple structure and improves the real-time performance of signal noise reduction to some extent. Furthermore, although the RNN model has a simple structure, it can achieve an excellent noise reduction effect in combination with the signal processing steps and the characteristics of the GRU itself. Therefore, the RNN model as provided herein achieves utilization of RNN noise reduction in real-time conferences, and solves the problems caused by poor real-time performance and large computation burden in the currently existing RNN noise reduction method that cannot be used in a real-time conference system. The present disclosure provides a RNN-based noise reduction method which has simple structure, simplified signal processing, reduced data computation burden and great real-time performance, and the RNN-based noise reduction method as provided herein can be used in real-time conferences.

Figure 4:
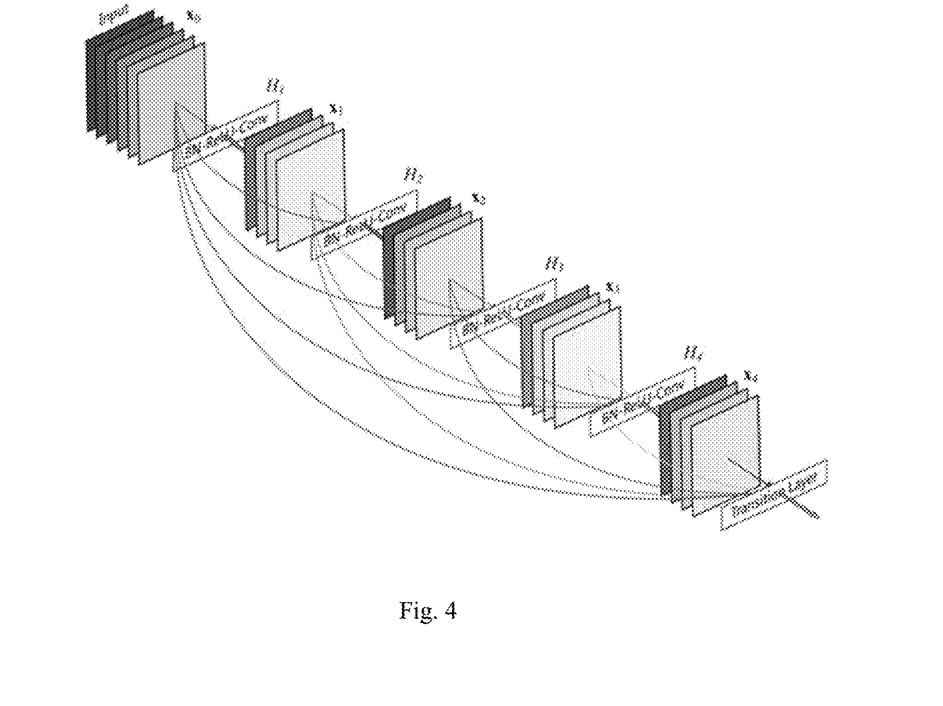
FIG. 4 is a schematic structural diagram of a fully connected layer of a RNN-based noise reduction method in a real-time conference as described herein.
Figure 5:
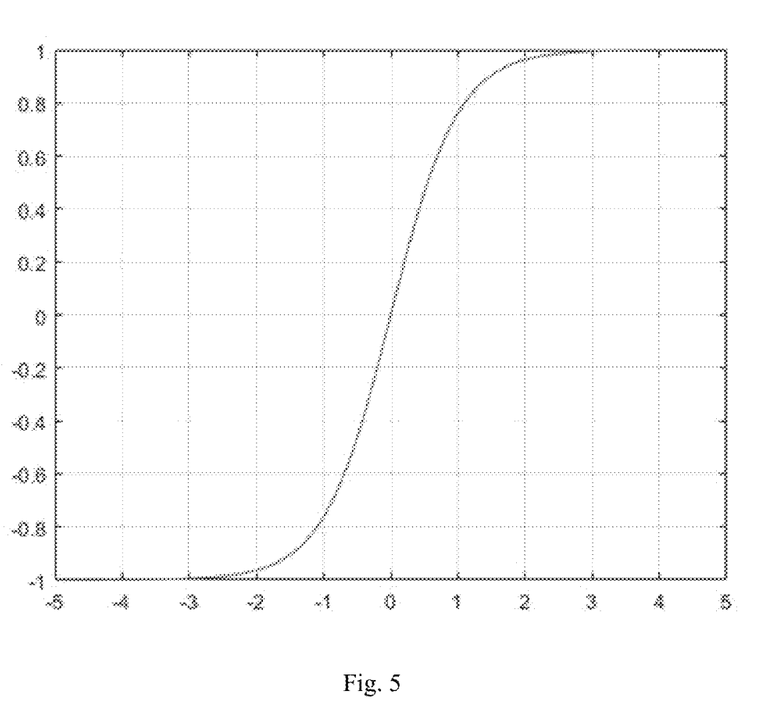
FIG. 5 is an activation function diagram of a fully connected layer of a RNN-based noise reduction method in a real-time conference as described herein.

A Tan h function is used as the activation function for the fully connected layer, which has a mean value of 0. The structure of the fully connected layer is shown in FIG. 4, and Tan h is used as the activation function. As shown in FIG. 5, the mean value of the Tan h function is 0, which achieves a good effect in practical applications.

The noise reduction suppression coefficient is obtained by smoothing the expected suppression parameter, which is obtained by estimating a logarithmic spectrum and the logarithmic spectrum of the original signal. Since the noise reduction suppression coefficient obtained is obtained by smoothing the expected suppression parameter, the continuity of the speech is ensured.

Frame-and-window for the signal is performed with the window length of 256 samples, and the framed signals are overlapped by 50%. The optimal window length in the present disclosure is 256 samples, which can improve the computation efficiency while ensuring that information is not lost. In particular, the GRU model can retain limited information in the past-time. For the purpose of satisfying the requirements on noise reduction effect and real-time performance in the real-time conference, the present disclosure provides an improvement on processing of speech signals. Since the minimum unit of a segment of speech can be divided into a basic syllable, the basic syllable of ordinary people's speech is between 80 ms and 160 ms, and the fast Fourier transform can improve the calculation speed based on the data of 2^N length, the window length of the present disclosure is set to 256 samples. Although framing according to 256 samples per frame may result in loss of the previous frame information, such a window length is able to ensure an increased calculation speed without loss of information since the GRU model can retain the information in the past-time to some extent. And in the present disclosure, 50% overlap of the framed signals can avoid inter-frame mutation. Since the GRU model as used in the present disclosure could retain the characteristics of the information in past-time to some extent, and an appropriate window length is selected for performing the frame-and-window of the speech signal, when inputting the RNN model for estimation, only the logarithmic spectrum of the current frame needs to be inputted. The RNN model of the present disclosure has few requirements on inputted information, without performing huge preprocessing on the received speech signal, which in turn reduces computation burden, increases response speed, and enhances real-time performance.

Figure 6:
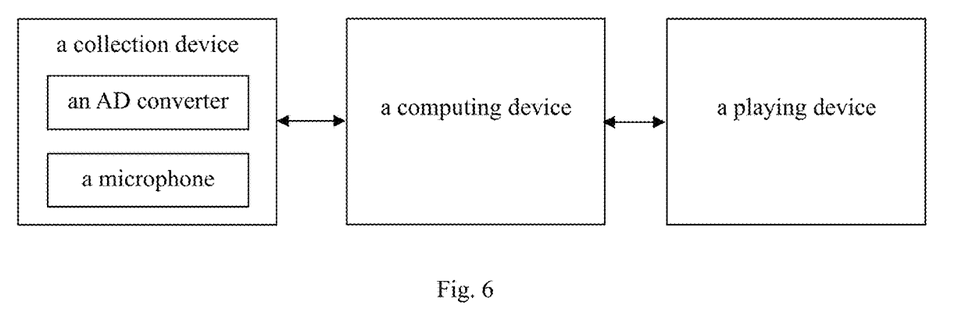
FIG. 6 is a structural block diagram 1 of a RNN-based noise reduction device in a real-time conference as described herein.

As shown in FIG. 6, the present disclosure provides a RNN-based noise reduction device in a real-time conference, comprising a collection device, a computing device and a playing device. The collection device collects a noisy speech signal and transmits it to the computing device. The computing device processes the noisy speech signal to obtain a denoised speech signal which is transmitted to the playing device. The computing device is the one that uses the RNN-based noise reduction method in a real-time conference as described above.

Compared with the prior arts, the RNN-based noise reduction device in a real-time conference as disclosed herein comprises a collection device through which a speech signal is collected, a computing device through which the speech signal is subject to noise reduction processing, and a playing device through which a denoised speech signal is played, wherein the computing device adopts a RNN-based noise reduction method in a real-time conference as provided herein. The RNN-based noise reduction method in a real-time conference as disclosed herein comprises: performing frame-and-window for a speech signal to obtain a logarithmic spectrum of the speech signal, and placing the logarithmic spectrum into the RNN model to determine the noise reduction suppression coefficient, and then obtaining the denoised speech signal by applying the noise reduction suppression coefficient to the logarithmic spectrum of the original signal, thereby achieving utilization of the RNN noise reduction method in real-time conferences.

In particular, the conventional RNN model is not suitable for the noise reduction in real-time conferences since it cannot well handle the long-distance dependence. For the LSTM which can well handle the long-distance dependence, it cannot be used for noise reduction in a real-time conference due to many existing problems, such as complicated structure, design difficulty, large computation burden, and unsatisfied real-time requirements. The structure of the GRU is relatively simple and suitable for noise reduction in a real-time conference. Therefore, the RNN model as used herein is the RNN model that uses the GRU. The GRU model as used herein retains information in past-time to some extent by updating and resetting the gate, so as to ensure the reliability of the training model. However, compared with LSTM, the GRU model can retain limited information in the past-time. For the purpose of satisfying the requirements on noise reduction effect and real-time performance in the real-time conference, the present disclosure provides an improvement on processing of speech signals. Since the minimum unit of a segment of speech can be divided into a basic syllable, the basic syllable of ordinary people's speech is between 80 ms and 160 ms, and the fast Fourier transform can improve the calculation speed based on the data of 2^N length, the window length of the present disclosure is set to 256 samples. Although framing according to 256 samples per frame may result in loss of the previous frame information, such a window length is able to ensure an increased calculation speed without loss of information since the GRU model can retain the information in the past-time to some extent. And in the present disclosure, 50% overlap of the framed signals can avoid inter-frame mutation.

Since the GRU model as used in the present disclosure could retain the characteristics of the information in past-time to some extent, and an appropriate window length is selected for performing the frame-and-window of the speech signal, when inputting the RNN model for estimation, only the logarithmic spectrum of the current frame needs to be inputted. The RNN model of the present disclosure has few requirements on inputted information, without performing huge preprocessing on the received speech signal, which in turn reduces computation burden, increases response speed, and enhances real-time performance. At the same time, a logarithmic spectrum in the frequency domain is used when performing signal comparison, and the logarithmic spectrum can significantly highlight the signal variation, and the logarithmic spectrum can be used to facilitate signal comparison when performing signal comparison. In the present disclosure, a logarithmic spectrum in the frequency domain is used for further reduction of the time for signal comparison and improvement of the real-time performance. Finally, after the logarithmic spectrum of the original signal is processed by the noise reduction suppression coefficient, the processed result is subjected to window overlap and inverse Fourier transform processing. Since the denoised signal is still subjected to window overlap processing, the effect for the processed signal can be further ensured, and excessive noise reduction can be avoided to ensure speech integrity.

In this regard, in the present disclosure, computation burden is reduced compared with that in the general RNN noise reduction method, the model structure and signal processing is simplified, and the real-time performance is enhanced by performing frame-and-window for the speech signal, selecting an appropriate window length, using the RNN model that uses the GRU, and using the logarithmic spectrum in the frequency domain to compare the signals. Moreover, the denoised signal is still subjected to window overlap processing, without excessive noise reduction, so as to ensure the speech integrity. Therefore, the RNN-based noise reduction device in a real-time conference as disclosed herein, realizes the application of the RNN noise reduction method in a real-time conference system, and solves the problem due to no RNN-based noise reduction device used in a real-time conference.

As shown in FIG. 6, the collection device includes a microphone and an AD converter. The microphone is coupled to the computing device via the AD converter; and the playing device is coupled to the computing device via a network. The microphone collects environment sounds which is converted into digital signal for calculation by the AD converter.

Figure 7:
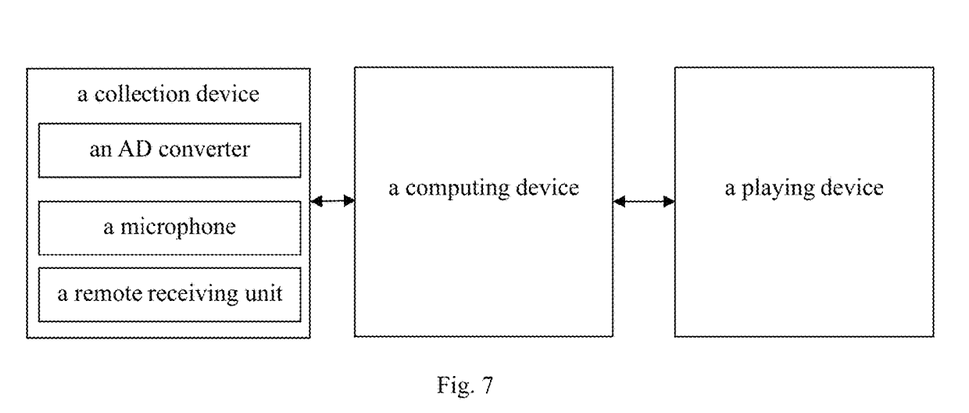
FIG. 7 is a structural block diagram 2 of a RNN-based noise reduction device in a real-time conference as described herein.

As shown in FIG. 7, the collection device further comprises a remote receiving unit, which is coupled to the computing device. The present disclosure provides a RNN-based noise reduction device in a real-time conference, wherein the collection device is configured to collect speech information and send it to the computing device. The RNN-based noise reduction device in a real-time conference as provided herein is applied to a real-time conference system to reduce noise in the real-time conference. Currently, noise reduction in a real-time conference is achieved by performing noise reduction on the speech signal collected from the microphone, and the denoised speech signal is sent to the playing device via a network to play. Such playing device is another real-time conference system. In particular, the current real-time conferences often use two real-time conference systems which are in communication with each other. One conference system sends speech information to another one. The current noise reduction in a real-time conference performs noise reduction immediately after receiving the speech in the conference system, and the denoised information is sent to another conference system which plays the denoised speech. However, in the RNN-based noise reduction device in a real-time conference as provided by the present disclosure, the collection device comprises a remote receiving unit, that is, the collection device can receive the speech that has been subjected to noise reduction sent by other conference systems, and the computing device performs further noise reduction on the received speech. The further denoised speech information is sent by the computing device to the playing device to play. That is to say, the conference system receives the speech information that has been subjected to noise reduction by other conference systems, which is further denoised and then played by the conference systems. The present disclosure provides a RNN-based noise reduction device in a real-time conference, which performs noise reduction twice for both communication parties in the real-time conference. Such repeated noise reduction ensures the noise reduction effect of the speech information, and the speech noise in the real-time conference is extremely removed. The RNN-based noise reduction device in the real-time conference as provided herein utilizes the RNN model with simple structure and simplified processing method for speech signal, such that the RNN-based noise reduction device in a real-time conference has a simple structure, simplified signal processing, reduced data computation burden, and enhanced real-time performance, with twice noise reduction for both communication parties to satisfy the real-time requirements of the real-time conference. Provided herein is a device for applying RNN noise reduction method in a real-time conference system, which maintains excellent noise reduction effect from RNN noise reduction method, and satisfies the real-time requirements of the real-time conference, and in turn solves the problem due to no RNN-based noise reduction device used in a real-time conference.

The computing device is a multi-CPU hardware device having a computing instruction function. Since the RNN-based noise reduction method in a real-time conference as described herein can be implemented by any hardware devices having a computing instruction function, the present disclosure adopts multiple CPUs for processing, thereby speeding up the processing, enhancing operating efficiency and improving real-time performance.

The foregoing is provided for illustration, and does not intend to limit the present disclosure. Any changes and modifications for the above embodiments come within the scope of the present disclosure.

The invention claimed is:

1. A method for RNN-based noise reduction in a real-time conference, wherein the method comprises the following steps:

S1, training RNN model that uses GRU to determine suitable parameters for the RNN model, to obtain the trained RNN model;

S2, performing frame-and-window for the speech signal transmitted by a collecting unit, to calculate a logarithmic spectrum of each frame of the speech signal in the frequency domain;

S3, placing the logarithmic spectrum of the current frame into the trained RNN model for estimation, to obtain an estimated logarithmic spectrum of the current speech;

S4, calculating a signal-to-noise ratio of the current frame according to the estimated logarithmic spectrum and the logarithmic spectrum of the original signal, to calculate a current noise reduction suppression coefficient according to the signal-to-noise ratio;

S5, applying the noise reduction suppression coefficient to the logarithmic spectrum of the original signal, performing window overlap and inverse Fourier transform on the result, and transmitting the result to a corresponding playing device through a network, to play the processed signal.

2. The method for RNN-based noise reduction in a real-time conference according to claim 1, wherein the step S1 comprises the following steps:
- S11, collecting a pure speech signal and a noise speech signal, and superimposing the pure speech signal and the noise speech signal in a time domain to generate a noisy speech signal;
- S12, performing frame-and-window for the noisy speech signal and the pure speech signal respectively, to calculate the logarithmic spectrum of each frame in the frequency domain, comparing the logarithmic spectrum of the noisy speech signal with the logarithmic spectrum of the pure speech signal to obtain corresponding accurate suppression parameters;
- S22, using the logarithmic spectrum of the noisy speech signal obtained after performing the frame-and-window as an input for the RNN model that uses the GRU;
- S23, generating a corresponding estimated logarithmic spectrum by allowing the logarithmic spectrum of the noisy speech signal to pass through a fully connected layer and two GRU layers, to obtain the expected suppression parameters according to the estimated logarithmic spectrum and the logarithmic spectrum of the noisy speech signal;
- S24, calculating a mean square error using the expected suppression parameters and the accurate suppression parameters, judging whether the mean square error is lower than the threshold, wherein if YES, this step is ended; and wherein if NOT, the mean square error is used for derivation to update the parameters of the RNN model that uses the GRU and return to step S11.

3. The method for RNN-based noise reduction in a real-time conference according to claim 2, wherein a Tan h function is used as the activation function for the fully connected layer, which has a mean value of 0.

4. The method for RNN-based noise reduction in a real-time conference according to claim 1, wherein the noise reduction suppression coefficient is obtained by smoothing the expected suppression parameter, which is obtained by estimating the logarithmic spectrum and the logarithmic spectrum of the original signal.

5. The method for RNN-based noise reduction in a real-time conference according to claim 1, wherein performing frame-and-window for the signal with the window length of 256 samples, and the framed signals are overlapped by 50%.

6. A device for RNN-based noise reduction in a real-time conference, wherein the device comprises a collection device, a computing device and a playing device; wherein the collection device collects a noisy speech signal and transmits it to the computing device, the computing device processes the noisy speech signal to obtain a denoised speech signal which is transmitted to the playing device; and the computing device is the one that uses the RNN-based noise reduction method in a real-time conference according to claim 1.

7. A device for RNN-based noise reduction in a real-time conference, wherein the device comprises a collection device, a computing device and a playing device; wherein the collection device collects a noisy speech signal and transmits it to the computing device, the computing device processes the noisy speech signal to obtain a denoised speech signal which is transmitted to the playing device; and the computing device is the one that uses the RNN-based noise reduction method in a real-time conference according to claim 2.

8. The device for RNN-based noise reduction in a real-time conference according to claim 7, wherein the collection device includes an AD converter and a microphone which is coupled to the computing device via the AD converter; and wherein the playing device is coupled to the computing device via a network.

9. The device for RNN-based noise reduction in a real-time conference according to claim 8, wherein the collection device further comprises a remote receiving unit, which is coupled to the computing device.

10. The device for RNN-based noise reduction in a real-time conference according to claim 7, wherein the computing device is a multi-CPU hardware device having a computing instruction function.

11. The method for RNN-based noise reduction in a real-time conference according to claim 2, wherein the noise reduction suppression coefficient is obtained by smoothing the expected suppression parameter, which is obtained by estimating the logarithmic spectrum and the logarithmic spectrum of the original signal.

12. The method for RNN-based noise reduction in a real-time conference according to claim 2, wherein performing frame-and-window for the signal with the window length of 256 samples, and the framed signals are overlapped by 50%.

13. The device for RNN-based noise reduction in a real-time conference according to claim 6, wherein the noise reduction suppression coefficient is obtained by smoothing the expected suppression parameter, which is obtained by estimating the logarithmic spectrum and the logarithmic spectrum of the original signal.

14. The device for RNN-based noise reduction in a real-time conference according to claim 6, wherein performing frame-and-window for the signal with the window length of 256 samples, and the framed signals are overlapped by 50%.

15. The device for RNN-based noise reduction in a real-time conference according to claim 7, wherein the noise reduction suppression coefficient is obtained by smoothing the expected suppression parameter, which is obtained by estimating the logarithmic spectrum and the logarithmic spectrum of the original signal.

16. The device for RNN-based noise reduction in a real-time conference according to claim 7, wherein performing frame-and-window for the signal with the window length of 256 samples, and the framed signals are overlapped by 50%.

* * * * *